US010423932B2

(12) United States Patent
Harris et al.

(10) Patent No.: US 10,423,932 B2
(45) Date of Patent: Sep. 24, 2019

(54) SYSTEMS AND METHODS FOR TASK ASSISTANCE

(71) Applicant: GOOGLE LLC, Mountain View, CA (US)

(72) Inventors: Tristan Harris, Santa Rosa, CA (US); Erwin Can Sar, San Francisco, CA (US); Timothy Youngjin Sohn, Mountain View, CA (US); Vijay Umapathy, Sunnyvale, CA (US); Jacqueline Amy Tsay, Mountain View, CA (US); Seth Isaac Glickman, San Francisco, CA (US)

(73) Assignee: Google LLC, Mountain View, CA (US)

( * ) Notice: Subject to any disclaimer, the term of this patent is extended or adjusted under 35 U.S.C. 154(b) by 885 days.

(21) Appl. No.: 14/473,564

(22) Filed: Aug. 29, 2014

(65) Prior Publication Data
US 2016/0063452 A1 Mar. 3, 2016

(51) Int. Cl.
G06Q 10/10 (2012.01)
H04L 12/58 (2006.01)
G06Q 50/26 (2012.01)
H04L 29/12 (2006.01)
G06Q 10/06 (2012.01)
G06Q 30/00 (2012.01)

(52) U.S. Cl.
CPC . G06Q 10/1097 (2013.01); G06Q 10/063114 (2013.01); G06Q 10/107 (2013.01); G06Q 30/018 (2013.01); G06Q 50/26 (2013.01); H04L 51/18 (2013.01); H04L 51/20 (2013.01)

(58) Field of Classification Search
None
See application file for complete search history.

(56) References Cited

U.S. PATENT DOCUMENTS

| 6,680,675 | B1 | 1/2004 | Suzuki |
| 8,648,715 | B2 | 2/2014 | Singh et al. |
| 8,698,622 | B1 | 4/2014 | Emigh |
| 8,738,277 | B1 | 5/2014 | Kurosawa et al. |
| 2005/0003834 | A1* | 1/2005 | Hughes ........... H04W 4/02 455/456.1 |
| 2009/0106681 | A1* | 4/2009 | Gupta ............. G06F 16/9537 715/771 |
| 2009/0239552 | A1 | 9/2009 | Churchill et al. |
| 2012/0304087 | A1* | 11/2012 | Walkin ............ H04L 12/1813 715/764 |
| 2014/0215472 | A1* | 7/2014 | Motahari Nezhad ........ G06Q 10/1097 718/102 |

* cited by examiner

Primary Examiner — Alan S Miller
Assistant Examiner — Ashley Y Young
(74) Attorney, Agent, or Firm — Botos Churchill IP Law LLP

(57) ABSTRACT

A method of task management executes at a computing device having one or more processors and memory. The memory stores one or more programs configured for execution by the one or more processors. There is received a description of a task associated with a user. Upon receipt of the description of the task, one or more entities associated with the task are identified using at least the description of the task and geographic information about the user. Information is identified for performing the task with the at least one respective entity in the one or more entities based upon an identity of the entity. This identified information for performing the task is then formatted for use by the user.

19 Claims, 11 Drawing Sheets

SYSTEMS AND METHODS FOR TASK ASSISTANCE

TECHNICAL FIELD

The disclosure relates generally to electronic messaging applications, and more specifically to providing task assistance.

BACKGROUND

Electronic messaging applications, such as email, convey various types of information to a recipient such as messages to and from various others. Some messages include a task that the recipient must perform. As such, many messaging applications track not only messages received by or sent by a recipient but also tasks that the recipient is to perform. Such tasks may be independent of messages to and from others, or associated with messages from others. What are needed in the art are systems and methods for assisting a recipient with performing such tasks.

SUMMARY

Disclosed implementations address the above deficiencies and other problems associated with performing tasks. The disclosed implementations provide ways to help a recipient perform tasks.

In accordance with some implementations, a method of task assistance executes at a computing device having one or more processors and memory. The memory stores one or more programs configured for execution by the one or more processors. A description of a task associated with a user is received. In some instances the user creates the task. In other instances the task is inferred, subject to user confirmation, from a message sent to the user, for instance an E-mail message. Upon receipt of the description of the task, one or more entities associated with the task are identified using at least the description of the task and geographic information about the user. In some instances, an entity is deemed to be associated with a task when the entity is capable of performing the task and the entity services such tasks from users that are at or from the location identified in the geographical information. Information for performing the task with at least one respective entity in the one or more entities based upon an identity of the entity is identified and formatted for use by the user.

In some instances, an entity in the one or more entities is a business or a government entity. In some instances, the task is cancellation of a subscription or recurring service and the information for performing the task is a telephone number, uniform resource locator, or mailing address used by an entity in the one or more entities to service requests to cancel subscription requests or requests to cancel a recurring service. In some instances, the task is a service request and the information for performing the task is a telephone number or uniform resource locator used by an entity in the one or more entities to handle the service request.

In some embodiments, the method further comprises providing an identification of a first entity in the one or more entities and a set of opening and closing times for each day of the week in which the first entity is available to handle the task.

In some instances, the method further comprises providing information on whether or not an entity in the one or more entities is presently available to perform the task. In some embodiments, when the entity is available to perform the task, a time of day is provided when the entity will stop receiving requests to perform the task.

In some embodiments, an entity in the one or more entities is a government entity and the task is obtaining or renewing a government license or obtaining or amending a government permit.

In some embodiments, the identifying one or more entities associated with the task comprises retrieving non-transient stored geographical information about the user. In some such embodiments, the information is stored as a user profile.

In some instances, the identifying the one or more entities associated with the task comprises retrieving the geographical information about the user from a wireless device associated with the user. In some such instances, the geographical information is a present location of the user. In other instances, the geographical information is a geographic position, such as a street address, that the user has provided for storage in a profile or other form of record associated with the user.

In some embodiments, an entity in the one or more entities is part of a larger organization and the identifying one or more entities associated with the task comprises resolving which entity in the larger organization pertains to the task based upon the geographical information about the user. For instance, in some embodiments the larger organization is a first government entity and an entity in the one more entities is a government office for the first government entity. In one example, the larger organization a Department of Motor Vehicles and the entity within the larger organization that is identified for a user is the office of the Department of Motor Vehicles that is most proximate to the and geographic information about the user. In another instance, the larger organization is a business organization and an entity in the one more entities is a location of an office for the business organization.

In some embodiments, the identifying information for performing the task with the at least one respective entity in the one or more entities is further based upon the description of the task. In some embodiments, the task is returning merchandise. In some embodiments, the method further comprises verifying that a first entity in the one or more entities is presently available to service the task and, when the first entity is not presently available to service the task, the method further comprises refraining from presenting information regarding the first entity.

Another aspect of the present disclosure provides a computing device comprising one or more processors, memory, and one or more programs stored in the memory. The one or more programs are configured for execution by the one or more processors. The one or more programs comprise instructions for receiving a description of a task associated with a user. Upon receipt of the description of the task, one or more entities associated with the task are identified using at least the description of the task and geographic information about the user. Information for performing the task with at least one respective entity in the one or more entities is identified based upon an identity of the entity. This information for performing the task is formatted for use by the user.

Another aspect of the present disclosure provides a non-transitory computer readable storage medium storing one or more programs configured for execution by a computing device having one or more processors and memory. The one or more programs comprise instructions for receiving a description of a task associated with a user. Upon receipt the description of the task, one or more entities associated with the task are identified using at least the description of the task and geographic information about the user. Information for performing the task with at least one respective entity in the one or more entities is identified based upon an identity of the entity. This information for performing the task is formatted for use by the user.

BRIEF DESCRIPTION OF THE DRAWINGS

For a better understanding of the aforementioned implementations of the invention as well as additional implementations thereof, reference should be made to the Description of Implementations below, in conjunction with the following drawings in which like reference numerals refer to corresponding parts throughout the figures.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1:
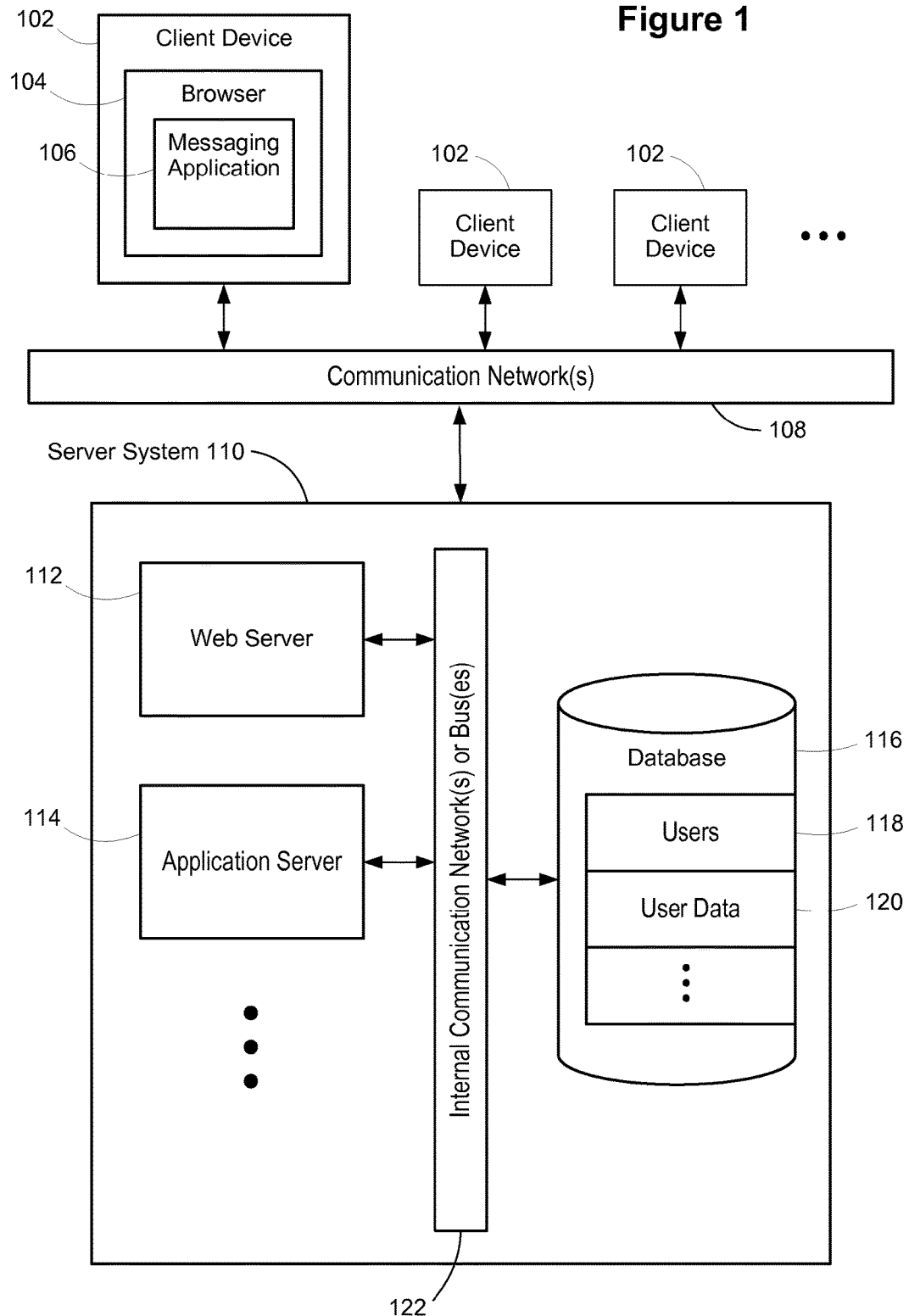
FIG. 1 illustrates a context in which some implementations operate.

FIG. 1 is a block diagram that illustrates the major components of some implementations. The various client devices 102 (also identified herein as computing devices) and servers 300 in a server system 110 communicate over one or more networks 108 (such as the Internet). A client device 102 may be a smart phone, a tablet computer, a laptop computer, a desktop computer, or other computing device that has access to a communication network 108 and can run a messaging application 106. In some implementations, the messaging application runs within a web browser 104.

In some implementations, the server system 110 consists of a single server 300. More commonly, the server system 110 includes a plurality of servers 300. In some implementations, the servers 300 are connected by an internal communication network of bus 122. The server system 110 includes one or more web servers 112, which receive requests from users (e.g., from client devices 102) and return appropriate information, resources, links, and so on. In some implementations, the server system 110 includes one or more application servers 114, which provide various applications, such as a messaging application 106. The server system 110 typically includes one or more databases 116, which store information such as web pages, a user list 118, and various user information 120 (e.g., user names and encrypted passwords, user preferences, and so on).

Figure 2:
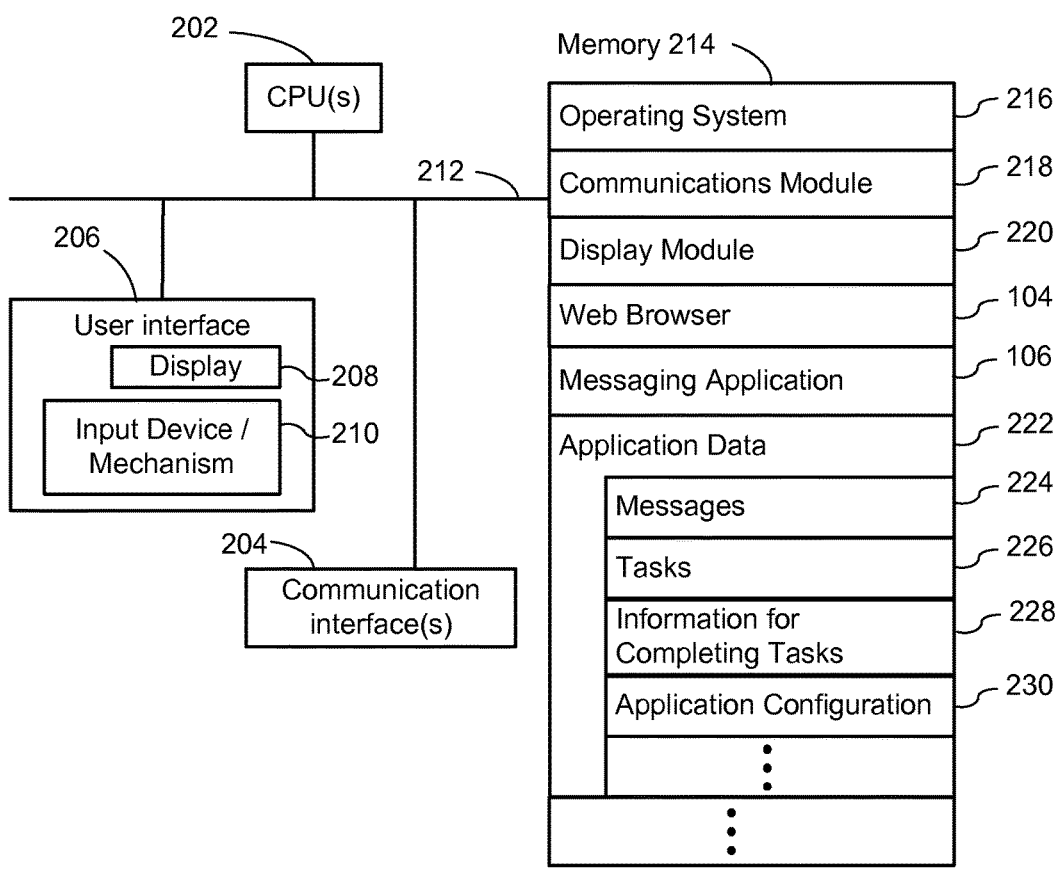
FIG. 2 is a block diagram of a client computing device according to some implementations.

FIG. 2 is a block diagram illustrating a client device 102 that a user uses to access a messaging application 106. A client device is also referred to as a computing device, which may be a tablet computer, a laptop computer, a smart phone, a desktop computer, a PDA, or other computing device than can run a messaging application 106 and has access to a communication network 108. A client device 102 typically includes one or more processing units (CPUs) 202 for executing modules, programs, or instructions stored in memory 214 and thereby performing processing operations; one or more network or other communications interfaces 204; memory 214; and one or more communication buses 212 for interconnecting these components. The communication buses 212 may include circuitry (sometimes called a chipset) that interconnects and controls communications between system components. A client device 102 includes a user interface 206 comprising a display device 208 and one or more input devices or mechanisms 210. In some implementations, the input device/mechanism includes a keyboard and a mouse; in some implementations, the input device/mechanism includes a "soft" keyboard, which is displayed as needed on the display device 208, enabling a user to "press keys" that appear on the display 208.

In some implementations, the memory 214 includes high-speed random access memory, such as DRAM, SRAM, DDR RAM or other random access solid state memory devices. In some implementations, memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within memory 214, comprises a non-transitory computer readable storage medium. In some implementations, the memory 214, or the computer readable storage medium of memory 214, stores the following programs, modules, and data structures, or a subset thereof:

- an operating system 216, which includes procedures for handling various basic system services and for performing hardware dependent tasks;
- a communications module 218, which is used for connecting the client device 102 to other computers and devices via the one or more communication network interfaces 204 (wired or wireless) and one or more communication networks 108, such as the Internet, other wide area networks, local area networks, metropolitan area networks, and so on;
- a display module 220, which receives input from the one or more input devices 210, and generates user interface elements for display on the display device 208;
- a web browser 104, which enables a user to communicate over a network 108 (such as the Internet) with remote computers or devices;
- a messaging application 106, which enables the user to send and receive electronic messages. In some implementations, the messaging application is an email application. In some implementations, the messaging application is an instant messaging application. In some implementations, the messaging application 106 runs within the web browser 104 as illustrated in FIG. 1. In some implementations, the messaging application 106 runs independently of a web browser 104 (e.g., a desktop application). An example messaging application is illustrated below in FIGS. 4A-4E; and
- application data 222, which is used by the messaging application 106. The application data comprises messages 224 (e.g., email messages or instant messages) as well as tasks 226, and information 228 for completing tasks. In some embodiments a task 226 is associated with a message 224. In some embodiments a task 226 is independent of all messages. The application data 222 may include configuration data 230, such as user preferences, user history, geographic information about the user, or the state of configuration options.

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 may store a subset of the modules and data structures identified above. Furthermore, the memory 214 may store additional modules or data structures not described above.

Although FIG. 2 shows a client device 102, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
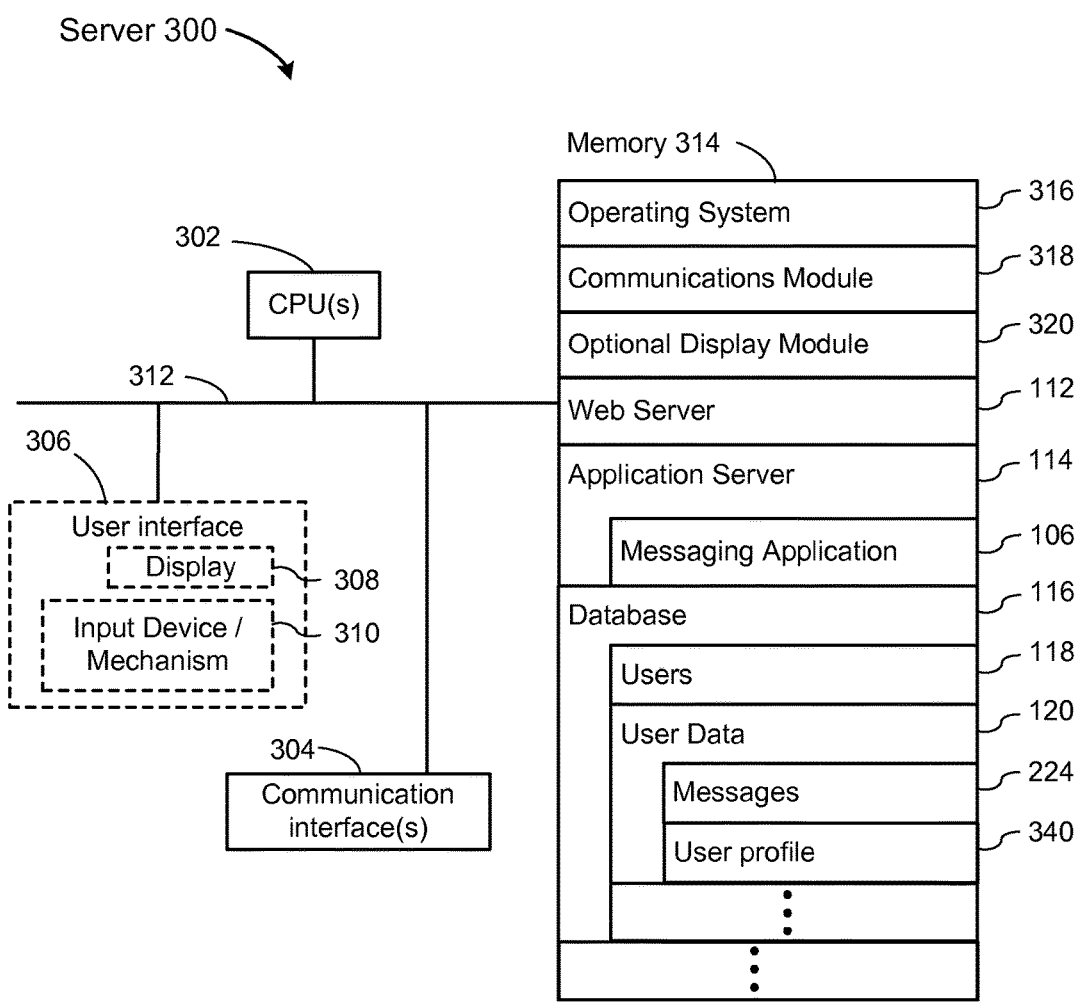
FIG. 3 is a block diagram of a server according to some implementations.

FIG. 3 is a block diagram illustrating a server 300 that may be used in a server system 110. A typical server system includes many individual servers 300, which may be hundreds or thousands. A server 300 typically includes one or more processing units (CPUs) 302 for executing modules, programs, or instructions stored in the memory 314 and thereby performing processing operations; one or more network or other communications interfaces 304; memory 314; and one or more communication buses 312 for interconnecting these components. The communication buses 312 may include circuitry (sometimes called a chipset) that interconnects and controls communications between system components. In some implementations, a server 300 includes a user interface 306, which may include a display device 308 and one or more input devices 310, such as a keyboard and a mouse.

In some implementations, the memory 314 includes high-speed random access memory, such as DRAM, SRAM, DDR RAM or other random access solid state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternately the non-volatile memory device(s) within memory 314, comprises a non-transitory computer readable storage medium. In some implementations, the memory 314, or the computer readable storage medium of memory 314, stores the following programs, modules, and data structures, or a subset thereof:

- an operating system 316, which includes procedures for handling various basic system services and for performing hardware dependent tasks;
- a communications module 318, which is used for connecting the server 300 to other computers via the one or more communication network interfaces 304 (wired or wireless), an internal network or bus 122, or other communication networks 108, such as the Internet, other wide area networks, local area networks, metropolitan area networks, and so on;
- an optional display module 320, which receives input from one or more input devices 310, and generates user interface elements for display on a display device 308;
- one or more web servers 112, which receive requests from client device 102, and returns responsive web pages, resources, or links. In some implementations, each request is logged in the database 116;
- one or more application servers 114, which provide various applications (such as an email or other messaging application) to client devices 102. In some instances, applications are provided as a set of web pages, which are delivered to client devices 102 and displayed in a web browser 104. The web pages are delivered as needed or requested. In some instances, an application is delivered to a client device 102 as a download, which is installed and run from the client device 102 outside of a web browser 104;
- one or more databases 116, which store various data used by the modules or programs identified above. In some implementations, the database 116 includes a list of authorized users, which may include user names, encrypted passwords, and other relevant information about each user. The database 116 also stores user specific data 120 that is used by one or more of the applications provided by the application server. For example, some implementations store the electronic messages 224 for each user. As another example, some implementations store geographic information about a user.

Each of the above identified elements in FIG. 3 may be stored in one or more of the previously mentioned memory devices. Each executable program, module, or procedure corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 314 may store a subset of the modules and data structures identified above. Furthermore, the memory 314 may store additional modules or data structures not described above.

Although FIG. 3 illustrates a server 300, FIG. 3 is intended more as functional illustration of the various features that may be present in a set of one or more servers rather than as a structural schematic of the implementations described herein. In practice, and as recognized by those of ordinary skill in the art, items shown separately could be combined and some items could be separated. The actual number of servers used to implement these features, and how features are allocated among them, will vary from one implementation to another, and may depend in part on the amount of data traffic that the system must handle during peak usage periods as well as during average usage periods.

As illustrated in FIGS. 2 and 3, the functionality for a messaging application may be shared between a client device 102 and a server system 110. In some implementations, after the messaging application is installed on a client device 102, the majority of the subsequent processing occurs on the client device. In other implementations, the majority of the processing and data storage occurs at a server 300, and the client device 102 uses a web browser 104 to view and interact with the data. One of skill in the art recognizes that various allocations of functionality between the client device 102 and the server system 110 are possible, and some implementations support multiple configurations (e.g., based on user selection).

Figure 4A:
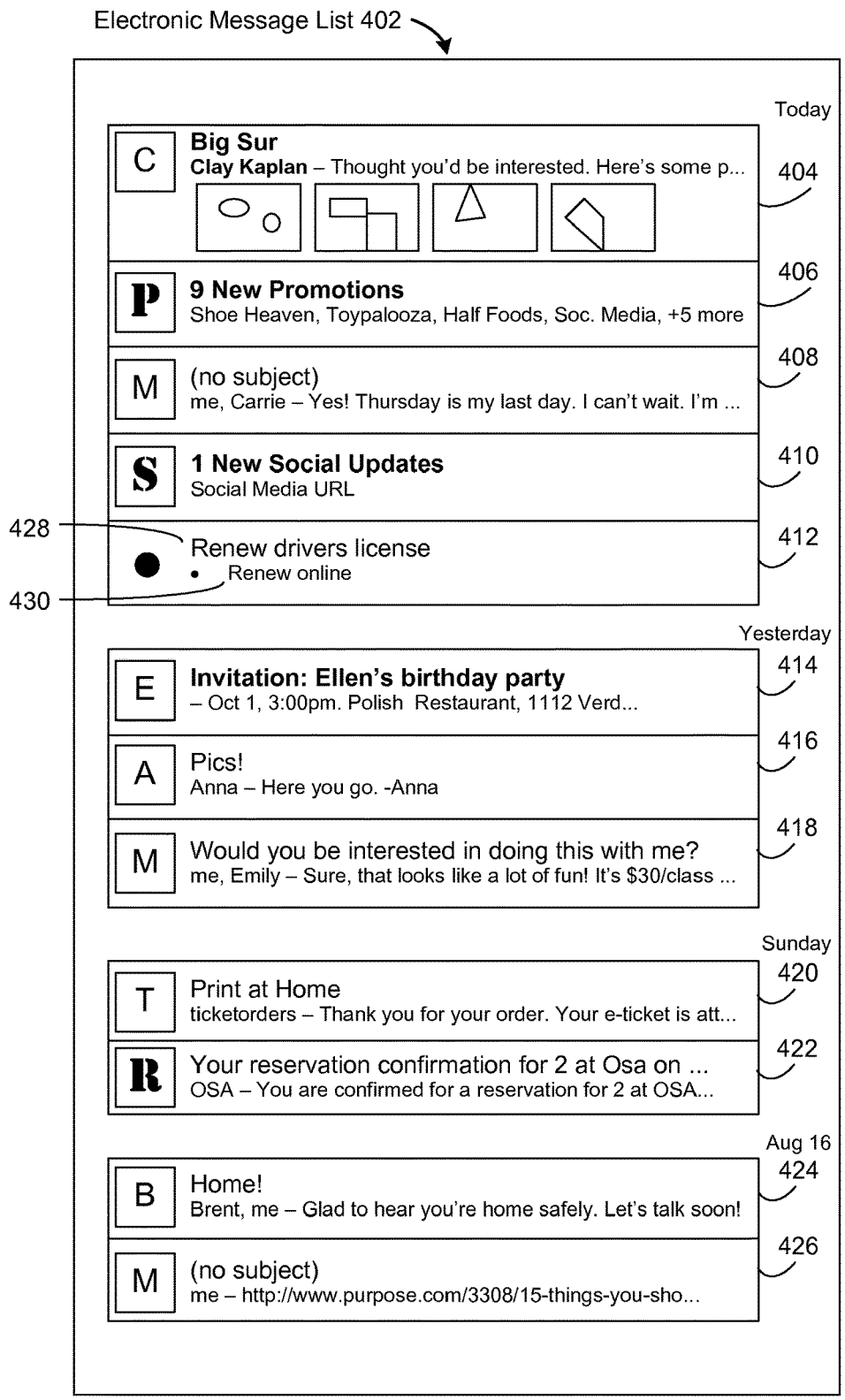
FIGS. 4A-4E illustrate aspects of a user interface for task assistance in accordance with some implementations.

FIG. 4A illustrates features of a messaging application that supports task assistance in accordance with some implementations. FIG. 4A illustrates an electronic message list 402, which may be displayed as part of an electronic messaging application (e.g., an email application). In this example, each row in the list represents a separate message object (e.g., messages 404, 408, and 414-426), a separate message cluster (e.g., 406, 410), or a task 412. The message objects all are intended for a user associated with the electronic message list 402. In some embodiments, individual messages (e.g., messages 404, 408, and 414-426) are message threads, message conversations, or messages that are addressed to one or more users, including the user uniquely associated with the electronic message list 402.

In FIG. 4A, the electronic message list 402 is, in particular, shown to comprise at least two message clusters, cluster 406 and cluster 410. Cluster 406 is a group of electronic messages having a collective association, namely promotional material (e.g., advertisements for retail sales, newsletters from stores). As can be seen in FIG. 4A, cluster 406 comprises nine new electronic messages, and cluster 410 comprises 1 new electronic message. In some embodiments, a new electronic message refers to a message that has not been viewed, opened, acknowledged or read by the user of the messaging application. Message clusters are disclosed further in U.S. patent application Ser. No. 14/145,005, entitled "Systems and Methods for Throttling Display of Electronic Messages," filed Dec. 31, 2013, and U.S. patent application Ser. No. 14/139,205, entitled "Systems and Methods for Clustering Electronic Messages," filed Dec. 23, 2013, each of which is hereby incorporated by reference herein in its entirety.

Continuing to refer to FIG. 4A, task assistance is disclosed in more detail. A description of a task 428 associated with a user is received. In some instances the user creates the description of the task 428 by direct input (e.g. through a keypad interface). In other instances, the task is inferred from an electronic message object in the electronic message list 402. Ways to infer a task from an electronic message object are disclosed in U.S. patent application Ser. No. 14/161,368, entitled "Identifying Tasks in Messages," filed Jan. 22, 2014, which is hereby incorporated by reference herein in its entirety.

Upon receipt of the description of the task (e.g., directly after the user provide the task), one or more entities associated with the task are identified using at least the description of the task and geographic information about the user. In some instances, an entity is deemed to be associated with a task when the entity is capable of performing the task and the entity services such tasks from users that are at or from the location identified in the geographical information. Information 430 for performing the task with at least one respective entity in the one or more entities based upon an identity of the entity is identified and formatted for use by the user. In the example illustrated in FIG. 4A, the description of the task "renew drivers license" coupled with geographic information about the user ("e.g., the user's home address or home GPS coordinates") is used to determine the correct department of motor vehicles website to suggest to the user. In one example, the user's geographic information identifies Daly City, Calif. and the Daly City office of the California Department of Motor Vehicles is identified as the information 430 for performing the task of renewing a driver's license. In this example, the URL for the Daly City office of the California Department of Motor Vehicles is formatted for use by the user. In another example, the user's geographic information identifies Daly City, Calif. and the California URL for the California Department of Motor Vehicles is identified as the information 430 for performing the task of renewing a driver's license. In this example, the California URL for the California Department of Motor Vehicles is formatted for use by the user.

Figure 4B:
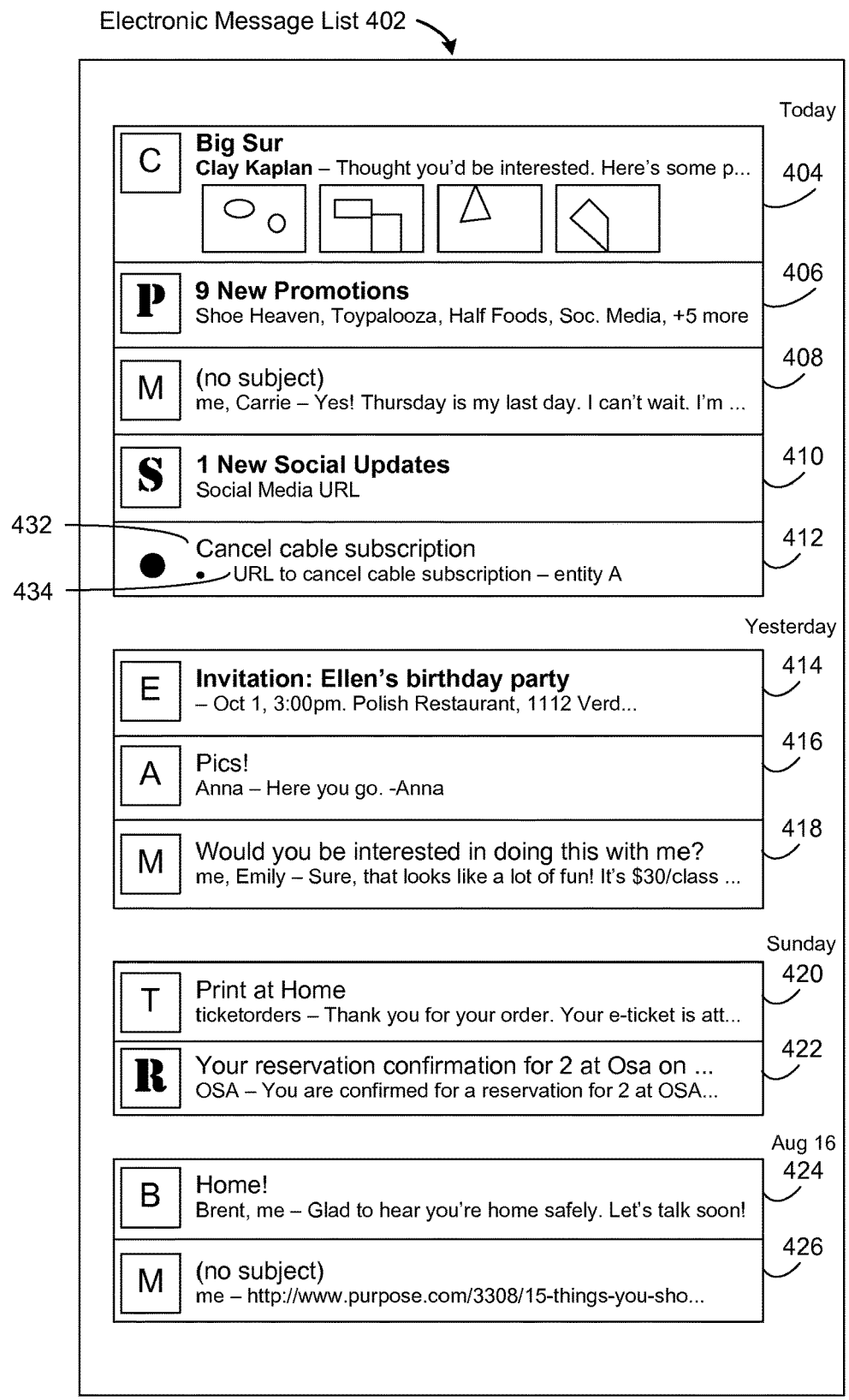
Figure 4C:
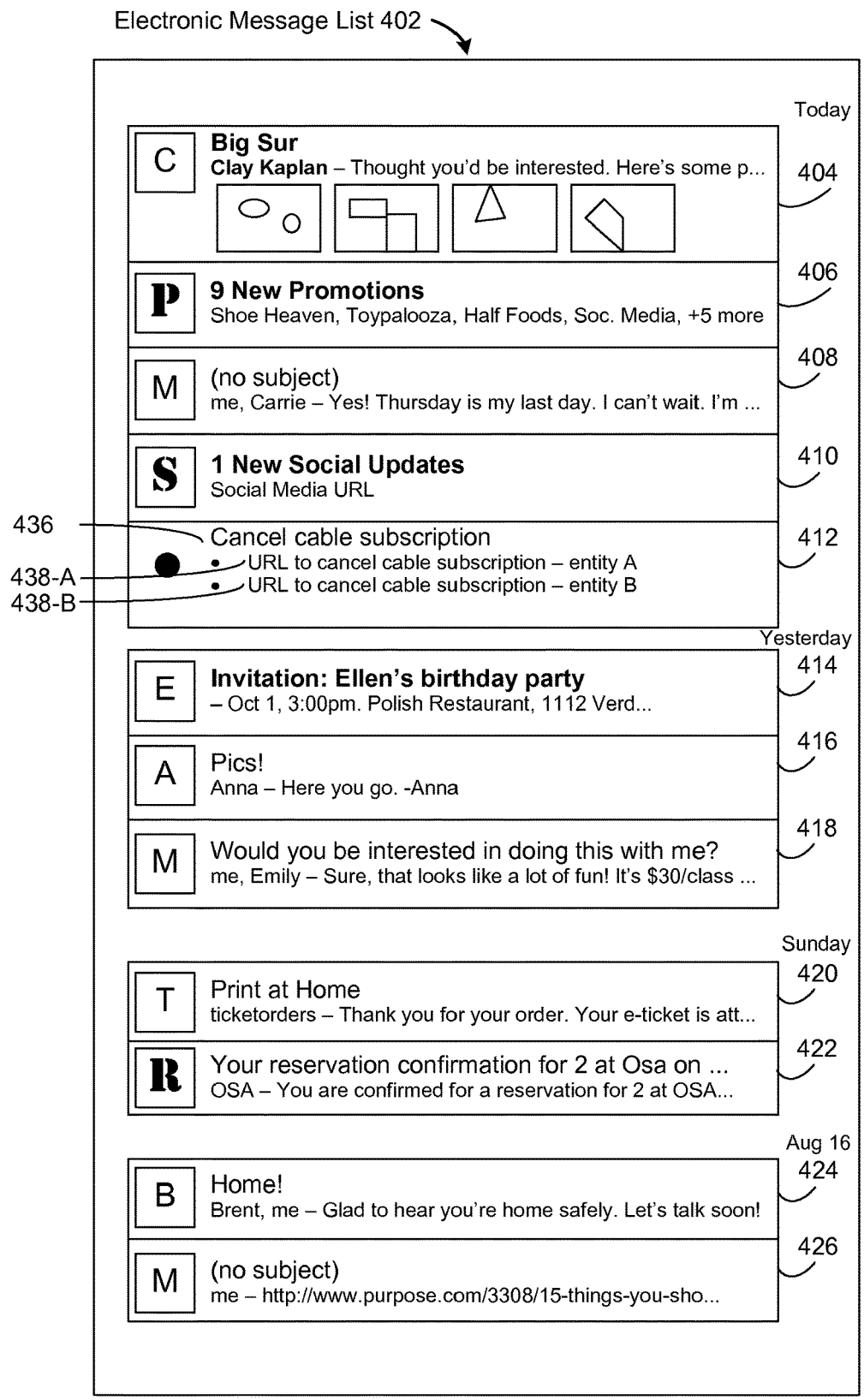

In some instances, an entity in the one or more entities is a business or a government entity. In some instances, the task is cancellation of a subscription or recurring service. For example, referring to FIG. 4B, the task 434 is cancelling a cable subscription and the information 436 for performing the task is a uniform resource locator for cancelling the cable subscription. In some instances, the information 438 for performing the task 436 using two or more entities in the identified one or more entities is provided, as illustrated in FIG. 4C. While FIGS. 4A through 4C provide the example of uniform resource locators that lead to information for performing the task, mailing addresses, phone numbers, social media handles, or any other form of method of communication information to perform the task can be provided. In some instances, the task is a service request (e.g., "call plumber") and the information for performing the task is a telephone number or uniform resource locator used by an entity in the one or more entities to handle the service request.

Figure 4D:
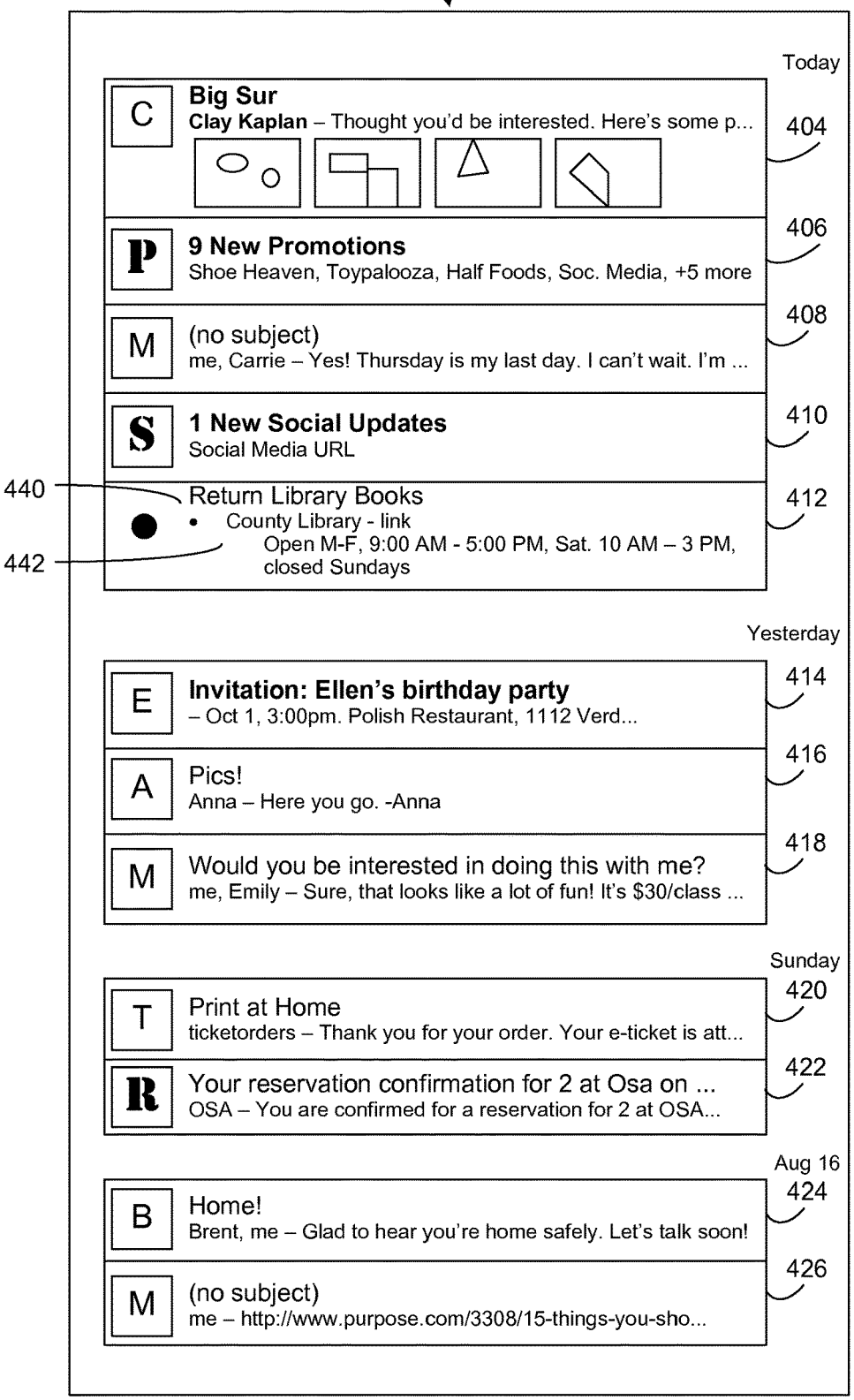

Referring to FIG. 4D, in some embodiments, the method further comprises providing an identification 440 of a first entity in the one or more entities and a set of opening and closing times 442 for each day of the week in which the first entity is available to handle the task.

Figure 4E:
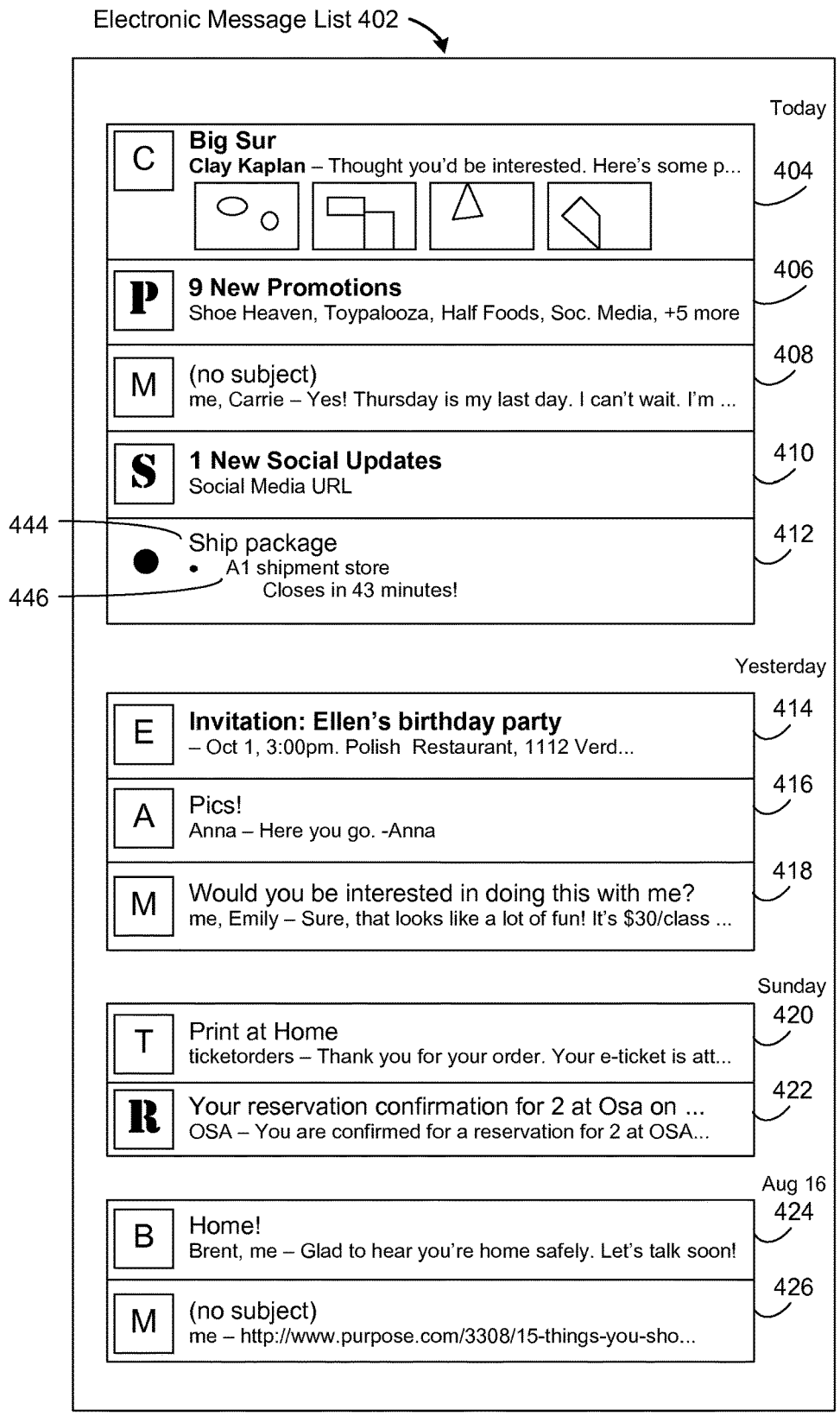

Referring to FIG. 4E, in some instances, the method further comprises providing information on whether or not an entity in the one or more entities is presently available to perform the task. In some embodiments, when the entity is available to perform the task, a time of day is provided when the entity will stop receiving requests to perform the task 444 or an amount of time 446 before the entity will stop receiving requests to perform the task is provided.

In some embodiments, an entity in the one or more entities is a government entity and the task is obtaining or renewing a government license or obtaining or amending a government permit. Examples of government licenses and permits include, but are not limited to drivers licenses, building permits, disabled parking permits, gun permits, hunting permits, environmental permits, fishing license, a liquor license, and a nightclub permit, to name a few nonlimiting examples.

In some embodiments, the identifying one or more entities associated with the task comprises retrieving non-transient stored geographical information about the user. In some such embodiments, the information is stored as a user profile. For example, referring to FIG. 3, in some embodiments the non-transient stored geographical information about the user is stored in a user profile 340 uniquely associated with the user.

In some instances, the identifying the one or more entities associated with the task comprises retrieving the geographical information about the user from a wireless device associated with the user. In some such instances, the geographical information is a present location of the user. In other instances, the geographical information is a geographic position, such as a street address, that the user has provided for storage in a profile (e.g., user profile 340 of FIG. 3) or other form of record associated with the user.

In some embodiments, the identifying information for performing the task with the at least one respective entity in the one or more entities is further based upon the description of the task. For example, if the description of the task is "repair automobile", the one or more entities provided will be those that wash automobiles. Alternatively, if the description of the task is "wash car", the one or more entities provided will be those that wash cars. Alternatively still, if the description of the task is "donate car", the one or more entities provided will be those that accept automobile donations.

Referring to FIG. 2, a display device 208 is inherently limited in size. Accordingly, the number of message objects displayed in the message list 402 is necessarily limited. Scrolling may be necessary for a user to get to a desired message. If the number of messages in the message list is small enough, all of the messages may be able to be displayed.

Figure 5A:
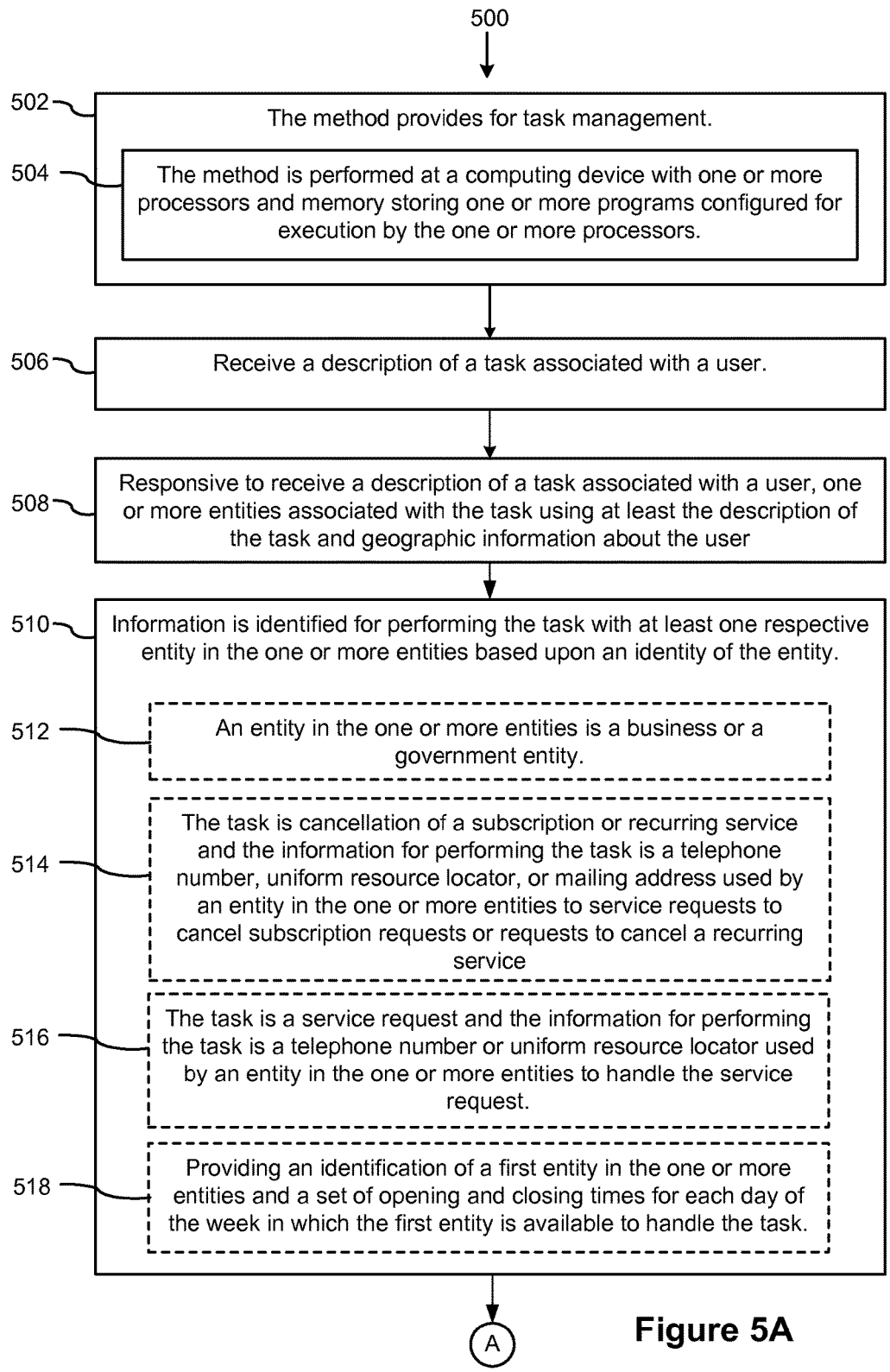
FIGS. 5A-5C provide a flowchart of a process for task assistance according to some implementations.
Figure 5B:
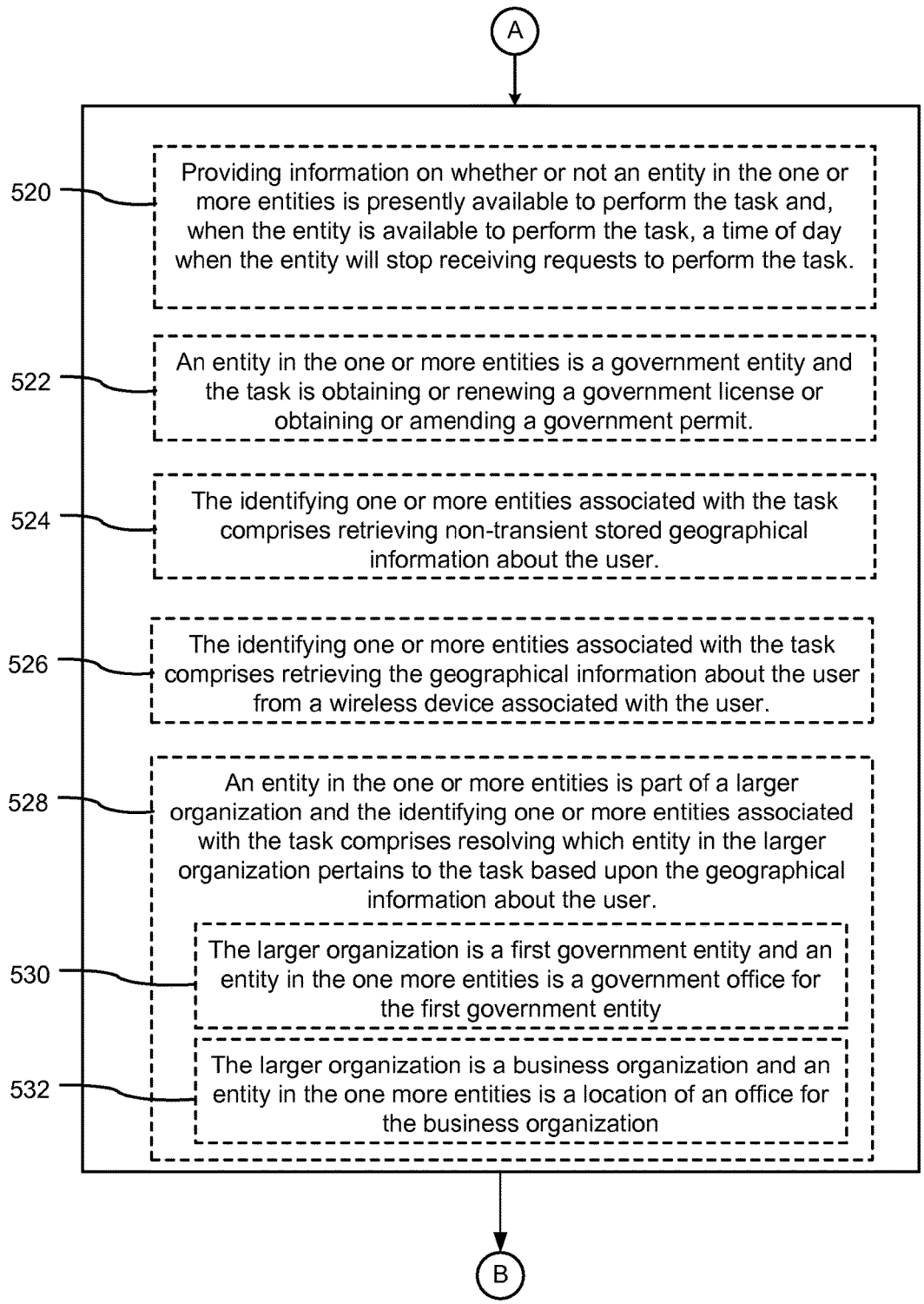
Figure 5C:
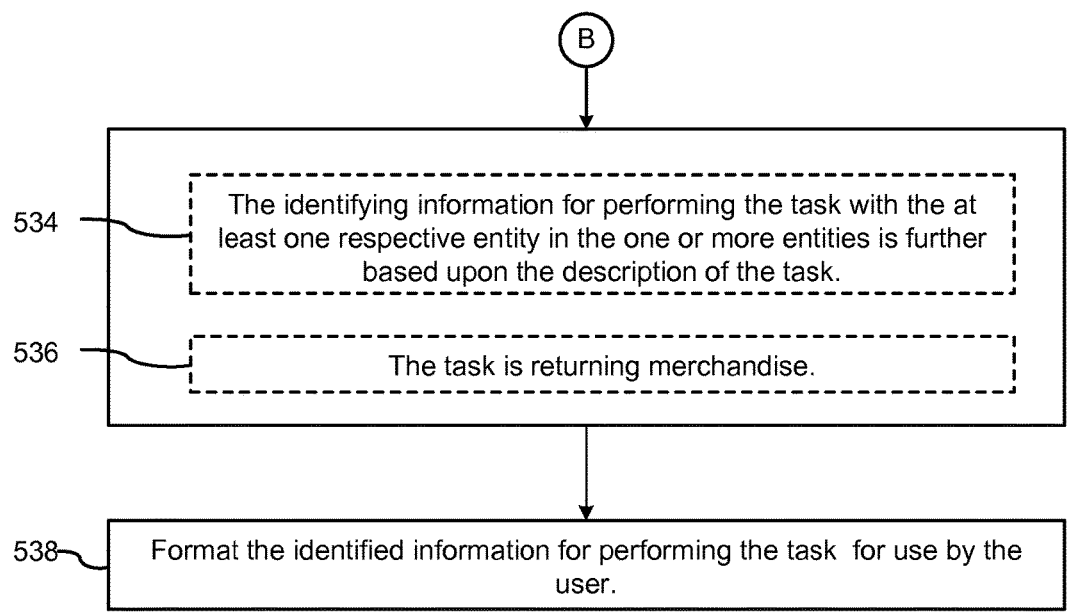

FIGS. 5A-5C provide a flowchart of a process 500, performed by a computing device, for providing task management (502). The method is performed (504) at a computing device 102 and/or 110 having one or more processors and memory. The memory stores (504) one or more programs configured for execution by the one or more processors.

A description of a task associated with a user is received. Upon receipt of the description of the task, one or more entities associated with the task are identified using at least the description of the task and geographic information about the user (508). Further, information is identified for performing the task with at least one respective entity in the one or more entities based upon an identity of the entity. In some implementations, an entity in the one or more entities is a business or a government entity (512).

In some implementations, the task is cancellation of a subscription or recurring service and the information for performing the task is a telephone number, uniform resource locator, or mailing address used by an entity in the one or more entities to service requests to cancel subscription requests or requests to cancel a recurring service (514). In some implementations, the task is a service request and the information for performing the task is a telephone number or uniform resource locator used by an entity in the one or more entities to handle the service request (516). In some implementations, the method further comprises providing an identification of a first entity in the one or more entities and a set of opening and closing times for each day of the week in which the first entity is available to handle the task (518).

In some implementations, information is provided on whether or not an entity in the one or more entities is presently available to perform the task and, when the entity is available to perform the task, a time of day when the entity will stop receiving requests to perform the task (520). In some implementations, an entity in the one or more entities is a government entity and the task is obtaining or renewing a government license or obtaining or amending a government permit (522). In some implementations, the identifying one or more entities associated with the task comprises retrieving non-transient stored geographical information about the user (524). In some implementations, the identifying one or more entities associated with the task comprises retrieving the geographical information about the user from a wireless device associated with the user (526).

In some implementations, an entity in the one or more entities is part of a larger organization and the identifying one or more entities associated with the task comprises resolving which entity in the larger organization pertains to the task based upon the geographical information about the user (528). In some implementations, the larger organization is a first government entity and an entity in the one more entities is a government office for the first government entity (530). In some implementations, the larger organization is a business organization and an entity in the one more entities is a location of an office for the business organization (532).

In some implementations, the identifying information for performing the task with the at least one respective entity in the one or more entities is further based upon the description of the task (534). In some implementations, the task is returning merchandise (536). The identified information is formatted for use by the user (538). For example, in some embodiments, the identified information is formatted for display on a client device 102.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations described herein were chosen and described in order to best explain the principles of the invention and its practical applications, to thereby enable others skilled in the art to best utilize the invention and various implementations with various modifications as are suited to the particular use contemplated.

What is claimed is:

1. A method of providing task assistance, comprising:
at a computing device having one or more processors and memory storing one or more programs configured for execution by the one or more processors:
displaying a user interface for an email application, including a plurality of email messages;
identifying, within the plurality of email messages, a first email message that includes a description of a task to be performed by a user;
in response to the identifying, automatically performing the following:
identifying a business entity associated with the task using one or more words appearing in the description of the task and geographic information about the user;
identifying information for performing the task with the identified business entity;
formatting the identified information for performing the task with the identified business entity;
determining whether the identified business entity is presently available to service the task according to a schedule of opening and closing times for the business entity, for each day of the week;
when the business entity is available to service the task, displaying, in the first email message, an identification of the business entity and the identified information for performing the task with the business entity; and
when the business entity is not available to service the task, refraining from displaying, in the first email message, the identification of the business entity and the identified information for performing the task with the business entity.

2. The method of claim 1, wherein the business entity is a government entity.

3. The method of claim 1, wherein the task is cancellation of a subscription or recurring service and wherein the identified information for performing the task is a telephone number, uniform resource locator, or mailing address used by the business entity to service requests to cancel a subscription or requests to cancel a recurring service.

4. The method of claim 1, wherein the task is a service request and wherein the identified information for performing the task is a telephone number or uniform resource locator used by the business entity to handle the service request.

5. The method of claim 1, wherein the identified information for performing the task comprises a time of day when the business entity will stop receiving requests to perform the task.

6. The method of claim 1, wherein the business entity is a government entity and the task is obtaining or renewing a government license or obtaining or amending a government permit.

7. The method of claim 1, wherein the identifying business entity associated with the task comprises retrieving non-transient stored geographical information about the user.

8. The method of claim 1, wherein the identifying business entity associated with the task comprises retrieving the geographical information about the user from a wireless device associated with the user.

9. The method of claim 1, wherein the business entity is part of a larger organization and identifying the business entity associated with the task comprises resolving which business entity in the larger organization pertains to the task based upon the geographical information about the user.

10. The method of claim 9, wherein the larger organization is a first government entity and the business entity is a government office for the first government entity.

11. The method of claim 9, wherein the larger organization is a business organization and the business entity is a location of an office for the business organization.

12. The method of claim 1, wherein the identifying information for performing the task with the business entity is further based upon the description of the task.

13. The method of claim 1, wherein the task is returning merchandise.

14. A computing device, comprising:
one or more processors;
memory; and
one or more programs stored in the memory configured for execution by the one or more processors, the one or more programs comprising instructions for:
displaying a user interface for an email application, including a plurality of email messages;
identifying, within the plurality of email messages, a first email message that includes a description of a task to be performed by a user;
in response to the identifying, automatically performing the following:
identifying a business entity associated with the task using one or more words appearing in the description of the task and geographic information about the user;
identifying information for performing the task with the identified business entity;
formatting the identified information for performing the task with the identified business entity;
determining whether the identified business entity is presently available to service the task according to a schedule of opening and closing times for the business entity, for each day of the week;
when the business entity is available to service the task, displaying, in the first email message, an identification of the business entity and the identified information for performing the task with the business entity; and
when the business entity is not available to service the task, refraining from displaying, in the first email message, the identification of the business entity and the identified information for performing the task with the business entity.

15. The computing device of claim 14, wherein the task is cancellation of a subscription or recurring service and wherein the identified information for performing the task is a telephone number, uniform resource locator, or mailing address used by the business entity to service requests to cancel subscription requests or requests to cancel a recurring service.

16. The computing device of claim 14, wherein the task is a service request and wherein the identified information for performing the task is a telephone number or uniform resource locator used by the business entity to handle the service request.

17. A non-transitory computer readable storage medium storing one or more programs configured for execution by a computing device having one or more processors and memory, the one or more programs comprising instructions for:
displaying a user interface for an email application, including a plurality of email messages;
identifying, within the plurality of email messages, a first email message that includes a description of a task to be performed by a user;
in response to the identifying, automatically performing the following:
identifying a business entity associated with the task using one or more words appearing in the description of the task and geographic information about the user;
identifying information for performing the task with the identified business entity;
formatting the identified information for performing the task with the identified business entity;
determining whether the identified business entity is presently available to service the task according to a schedule of opening and closing times for the business entity, for each day of the week;
when the business entity is available to service the task, displaying, in the first email message, an identification of the business entity and the identified information for performing the task with the business entity; and
when the business entity is not available to service the task, refraining from displaying, in the first email message, the identification of the business entity and the identified information for performing the task with the business entity.

18. The non-transitory computer readable storage medium of claim 17, wherein the task is cancellation of a subscription or recurring service and wherein the identified information for performing the task is a telephone number, uniform resource locator, or mailing address used by the business entity to service requests to cancel subscription requests or requests to cancel a recurring service.

19. The method of claim 1, wherein displaying the identified information for performing the task with the business entity comprises displaying a uniform resource locator (URL) for one or more resources of the business entity.

* * * * *